United States Patent
Mosko et al.

(10) Patent No.: US 8,165,129 B2
(45) Date of Patent: Apr. 24, 2012

(54) METHOD AND APPARATUS FOR FACILITATING RE-TRANSMITTING UNACKNOWLEDGED PACKETS

(75) Inventors: Marc Mosko, Santa Cruz, CA (US); Rebecca L. Braynard Silberstein, Sunnyvale, CA (US); Ignacio Solis, Santa Cruz, CA (US); Jose J. Garcia-Luna-Aceves, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 711 days.

(21) Appl. No.: 12/327,660

(22) Filed: Dec. 3, 2008

(65) Prior Publication Data

US 2010/0135261 A1    Jun. 3, 2010

(51) Int. Cl.
*H04L 12/28* (2006.01)
(52) U.S. Cl. .................. 370/394; 370/465; 370/476
(58) Field of Classification Search ............ 370/310, 370/328, 352, 394, 395, 465, 468, 470–476; 455/435, 445
See application file for complete search history.

(56) References Cited

U.S. PATENT DOCUMENTS

| | | | |
|---|---|---|---|
| 6,301,249 B1 * | 10/2001 | Mansfield et al. | 370/394 |
| 6,466,552 B1 * | 10/2002 | Haumont | 370/310 |
| 6,621,829 B1 * | 9/2003 | Achilles et al. | 370/468 |
| 2002/0098840 A1 * | 7/2002 | Hanson et al. | 455/435 |
| 2004/0192312 A1 * | 9/2004 | Li et al. | 455/445 |

* cited by examiner

*Primary Examiner* — Andrew Lai
(74) *Attorney, Agent, or Firm* — Shun Yao; Park, Vaughan, Fleming & Dowler LLP

(57) ABSTRACT

One embodiment of the present invention provides a system for facilitating re-transmitting packets in a communication network. During operation, the system transmits one or more acknowledgments to a neighbor in a designated time slot. Next, the system receives one or more acknowledgments from the neighbor, where a respective acknowledgment confirms that the data packets in a given past time slot have been processed by the neighbor. The system also receives a processed-through-counter (PTC) from the neighbor. Next, the system identifies a time slot up to the time slot indicated in the PTC and which has not been acknowledged by the neighbor. After identifying the time slot, the system re-transmits previously transmitted packets associated with the identified time slot to the neighbor without using a re-transmit timer.

16 Claims, 5 Drawing Sheets

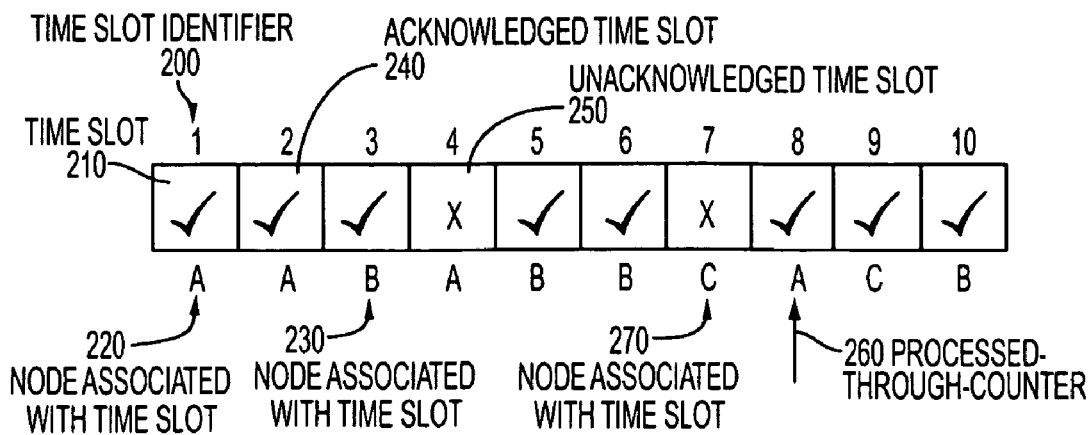
FIG. 2A
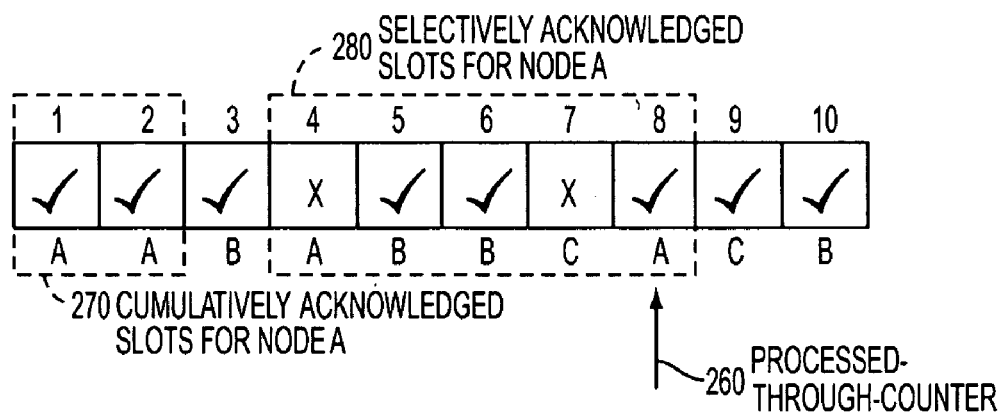
FIG. 2B
| | | ACKNOWLEDGMENTS | |
|---|---|---|---|
| | | CUMULATIVE | SELECTIVE |
| NODES | A | 2 | 4-8 |
| | B | 10 | - |
| | C | - | 9 |
FIG. 2C

METHOD AND APPARATUS FOR FACILITATING RE-TRANSMITTING UNACKNOWLEDGED PACKETS

FIELD

The present disclosure relates generally to an error-control method for data transmissions in a computer network. More specifically, the present disclosure relates to a method for facilitating re-transmitting unacknowledged packets without a timer in an ad hoc dynamic wireless broadcast network.

RELATED ART

In an ad hoc wireless network, a packet transmitted from a node to a neighbor can sometimes be damaged or lost. A packet might be received by the neighbor, but deemed "damaged" based on information associated with the packet such as the Cyclic Redundancy Code (CRC). The packet might be lost, meaning that the neighbor never received the packet. In the context of damaged or lost packets, re-transmission means that the packet is re-sent to the neighbor to replace the damaged or lost packet. Re-transmission is especially important in unreliable communication networks (i.e., networks with no guarantee that packets will be delivered successfully).

As a result, unreliable communication networks typically use explicit and implicit acknowledgment schemes. An explicit acknowledgment scheme requires the receiver to send an explicit indication of which packets it has successfully received (i.e., a positive acknowledgment) or which packets it has not received successfully (i.e., a negative acknowledgment). In an implicit acknowledgement scheme the receiver implicitly acknowledges that it has correctly received a packet by forwarding the packet to the next-hop node, which can be "overheard" by the sender (e.g., in a wireless broadcast network). Since the sender can "overhear" that the packet has been forwarded, the sender can infer that the packet must have been successfully received by the receiver.

Explicit acknowledgment schemes include selective acknowledgments and cumulative acknowledgments. In a selective acknowledgment scheme, the receiver acknowledges only those packets that were successfully received. In a cumulative acknowledgment scheme, the receiver acknowledges only the last successfully received packet in a contiguous stream of successfully received packets. Both methods can use a sliding-window mechanism based on packet sequence numbers to facilitate flow control.

Unfortunately, a positive acknowledgment from a receiver does not alone enable a sender to determine if a transmitted but non-acknowledged packet should be re-transmitted. This is because a sent packet might have been received, but simply not yet processed or acknowledged by the receiving node. For example, the receiver may have been too busy to have acknowledged the packet yet.

Timer-based re-transmission mechanisms attempt to ameliorate the problem of when to re-transmit a packet. Under timer-based re-transmission, a sender will re-transmit a packet if it has not received a positive or negative acknowledgment after a specified time has elapsed. Unfortunately, timer-based re-transmission can slow down the receiver and cause unnecessary congestion by allowing the sender to re-transmit too early (i.e., before the sender finds out whether the packet was positively acknowledged). For example, the receiver might have successfully received a packet, but might have been too busy to send an acknowledgment. If the sender decides to re-transmit the packet because the specified time has elapsed after sending the packet, the receiver receives the re-transmitted packet and will now have two duplicate packets (i.e., one from the earlier transmission and one from the re-transmission). As a result, the receiver must detect and eliminate duplicates to prevent duplicate packets from circulating in the network. This detection and elimination of duplicates slows down the receiver. Not only is the receiver slowed down by duplicate packet detection and elimination, but the sender also causes unnecessary traffic by re-transmitting the packet when it does not need to.

Timers can also be used on the receiver side. A receiver can notify the sender that an expected packet has not arrived when a specified time has elapsed after the expected arrival of the packet. Similarly, timer-based re-transmission requests from the receiver can slow down the receiver and cause unnecessary congestion. For example, the sender might be too busy to send the packet within the specified time or the transmission channel might experience caused unexpected delays. If the receiver requests a re-transmit of the packet and subsequently receives duplicate packets, the receiver needs to detect and eliminate duplicate packets. Furthermore, the sender transmits the same packet twice, causing unnecessary congestion in the network.

Timer-based re-transmission can also squander time. For example, if a packet is lost or damaged, the sender might wait too long before re-transmitting or the receiver might wait too long before requesting a re-transmit. If the packet were re-transmitted earlier, less time would be squandered. Tuning a timer so that the timer avoids both early re-transmits and squandered time is difficult, if not impossible.

Moreover, the feedback on whether or not a transmission was successful is delayed by an unknown or variable amount of time. This is partially because a sender does not generally know when the receiver has a time slot to transmit an acknowledgment back to the sender. Even if the sender is aware of the acknowledgement time slot, the receiver might be too busy to send an acknowledgment.

SUMMARY

One embodiment of the present invention provides a system for facilitating re-transmitting packets in a communication network. During operation, the system transmits one or more acknowledgments to a neighbor in a designated time slot. Next, the system receives one or more acknowledgments from the neighbor, where a respective acknowledgment confirms that the data packets in a given past time slot have been processed by the neighbor. The system also receives a processed-through-counter (PTC) from the neighbor, where the PTC indicates a time slot, and where the packets transmitted in any time slot indicated in the PTC have either been received and acknowledged by the neighbor or have not been received successfully by the neighbor. Next, the system identifies a time slot up to and including the time slot indicated in the PTC and which has not been acknowledged by the neighbor. After identifying the time slot, the system re-transmits previously transmitted packets associated with the identified time slot to the neighbor without using a re-transmit timer.

In one variation on this embodiment, the system maintains a send window of all unacknowledged packets.

In one variation on this embodiment, the system maintains an index of which packets are sent in which time slots.

In one variation on this embodiment, the system maintains a re-transmit queue of an ordered list of packets which can be re-transmitted.

Another embodiment of the present invention provides a system for facilitating re-transmitting packets in a communication network. During operation, the system sends one or more acknowledgments to a neighbor, where a respective acknowledgment confirms that the data packets in a given past time slot have been processed, and where sending the one or more acknowledgments does not involve a re-transmit timer. Next, the system sends a processed-through-counter (PTC) to the neighbor, where the PTC indicates a time slot and where the packets transmitted in any time slot indicated in the PTC have either been received and acknowledged or have not been received successfully.

BRIEF DESCRIPTION OF THE FIGURES

FIG. 2A illustrates an exemplary acknowledgment and an exemplary processed-through-counter in accordance with an embodiment of the present invention.

FIG. 2B illustrates an exemplary cumulative acknowledgment and an exemplary selective acknowledgment in accordance with an embodiment of the present invention.

FIG. 2C presents an exemplary set of acknowledgments for several nodes in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention combine a positive acknowledgment of time slots (rather than packets) with a processed-through-counter (PTC), which enables a node to determine when to re-transmit without using a re-transmit timer. Although the context of this disclosure is ad hoc dynamic wireless networks, embodiments of the present invention can be applied in various other networks, such as fixed and wired networks.

Figure 1:
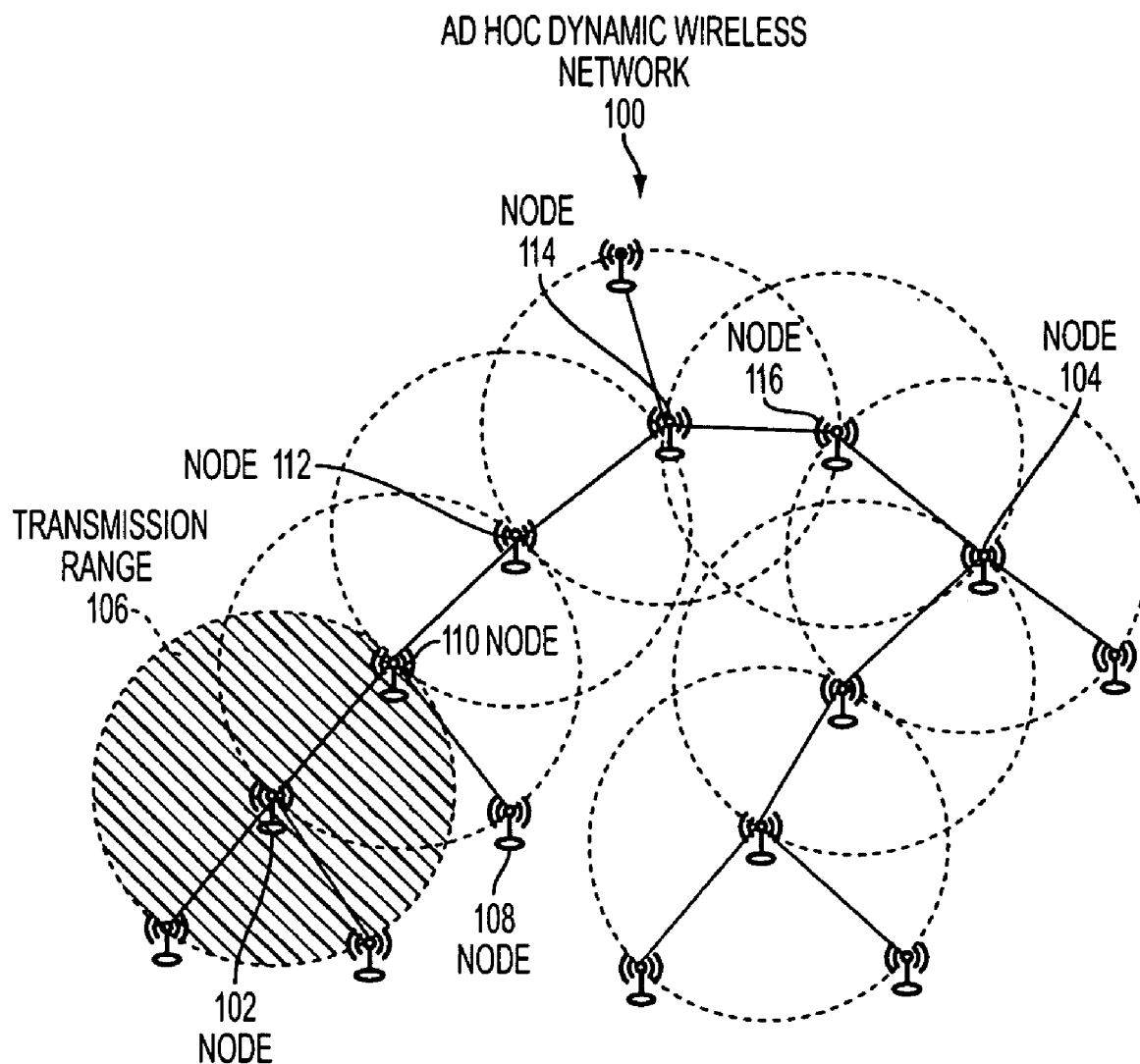
FIG. 1 illustrates an exemplary ad hoc wireless network in accordance with an embodiment of the present invention.

FIG. 1 illustrates a dynamic ad hoc wireless network 100 in accordance with embodiments of the present invention. As illustrated in FIG. 1, wireless network 100 includes nodes 102, 104, 108, 110, 112, and 116. During typical operation, nodes send packets, in pre-defined time slots, to each other and these packets are routed through intermediate nodes. A packet is a block of data that can vary in length. However, embodiments of the present invention are independent of packet length. For example, a packet can also be of fixed length.

Nodes in wireless network 100 can send one or more packets to each other. For example, node 108 can send one or more packets to node 104. These packets might be routed through nodes 110, 112, 114, and 116. In general, routing is partially determined by the transmission range. For example, transmission range 106 represents the maximum reliable transmission distance for node 102. Only those nodes within transmission range 106 (e.g., node 110) can receive transmissions from node 102. A node within the transmission range of another node is called a neighbor. Each node dynamic wireless network 100 is typically equipped with an omni-directional transceiver. Because the transmitter is omni-directional, other neighbor nodes can "overhear" the transmission of a packet from one node to another. Such "overhearing" enables implicit acknowledgment.

A time slot in wireless network 100 corresponds to a specified time interval during which a node can transmit packets. Multiple packets can be sent in the same time slot. Multiple nodes can compete for the same time slot. Various methods can be used for designating a time slot at the sending node. For example, the sender can assume a time slot is designated for that node's transmission after the sender has successfully reserved that time slot. Or, the receiver can communicate to the node that a particular time slot is available for that node's exclusive use (possibly in response to a request for a time slot from the node to the receiver).

Once the data in a time slot is transmitted from a sender node to a neighbor, the neighbor can send an acknowledgment of that time slot. An acknowledgment can be a combination of implicit (i.e., a node overhears that the data in a time slot that node sent to a neighbor has been forwarded by the neighbor), cumulative, and selective acknowledgment.

FIG. 2A illustrates an acknowledgment in accordance with an embodiment of the present invention. An acknowledgment can correspond to a number of time slots. A time slot containing data that has been successfully received and processed is positively acknowledged (indicated by a check mark). A time slot that has not been acknowledged is indicated by an "x" mark. A time slot represents a particular interval of time in which a node intends to transmit one or more packets to a neighbor. For example, time slot identifier 200 indexes time slot 210.

To facilitate indexing, time slot identifiers can be natural numbers. The check mark in time slot 210 means that the packets associated with that time slot have been processed by the neighbor who sends the acknowledgment.

One or more packets from a sender can share the same time slot. This enables a neighbor node to acknowledge the one or more packets simultaneously with a single acknowledgment. For example, time slot 1 might be associated with five packets, and the acknowledgment means that all five packets have been acknowledged. Various methods can be used to aggregate multiple packets into one time slot.

A positively acknowledged slot can mean that all of the packets associated with the time slot have been successfully received and processed. A non-positively acknowledged slot can mean that at least one packet associated with the time slot has been damaged, lost, or not-yet-processed.

Since multiple nodes can attempt to transmit at the same time slot due to the dynamic nature of an ad hoc network, in one embodiment of the present invention, the neighbor acknowledges a time slot to a specific sending node (i.e., the one from which the neighbor has successfully received data). In the example in FIG. 2A, node A transmits in time slot 220 (time slot indexed by 1). Time slot 250 is unacknowledged. Other transmitting nodes can be associated with other time slots. For example, node B is associated with time slot 230 (time slot indexed by 3) and node C is associated with time slot 270 (time slot indexed by 7). Thus, the acknowledgment the neighbor sends is specific to each node that has sent packets to the neighbor. Other embodiments of the present invention might not allow multiple nodes to simultaneously claim a slot. In these embodiments, a neighbor can broadcast the same acknowledgment to all sending nodes rather than sending node-specific acknowledgments.

FIG. 2A also illustrates a processed-through-counter 260, which will be described in more detail in the following sections.

FIG. 2B illustrates an exemplary cumulative acknowledgment. For example, cumulatively acknowledged slots 270 for node A can indicate that the neighbor has cumulatively acknowledged time slots up to 2 for node A. Note that time slot 3 is not included in acknowledgement 270 because it refers to another transmitting node's traffic. In general, a cumulative acknowledgment is an acknowledgement for all the time slots containing received and processed data from a particular transmitting node.

In one embodiment of the present invention, cumulatively acknowledged slots for a node can be compactly represented by the highest time slot index of the last received and processed time slot. For example, the cumulatively acknowledged slots for node A can be compactly represented by time slot 2. Thus, acknowledgement 270 needs only indicate the index "2" rather than specify both "1" and "2" to cumulatively acknowledge time slots 1 and 2 for node A. Moreover, time slot numbers, which use relative offsets, typically require fewer bits to represent than sequence number counters, which can become large and require more bits.

FIG. 2B also illustrates an exemplary selective acknowledgment. For example, selectively acknowledged slots 280 for node A span the acknowledgments (or lack thereof) for nodes B and C. The selectively acknowledged slots for a node can be represented using various methods. For example, a bit vector can be used to represent the positively acknowledged slots, where a "1" represents a positively acknowledged slot and a "0" represents a non-positively acknowledged slot for the node. In addition, a selective acknowledgment for node A, spanning time slots 4-8, might be represented by the bit vector "00001." Note that this selective acknowledgment for node A spans time slots for nodes B and C, but these time slots are represented by a "0." They could also be represented by a "1" because node A can distinguish on which time slots it has sent packets.

In one embodiment, the transmitter can use a sliding window mechanism to transmit data while waiting for acknowledgements for previously transmitted data. When a time slot is acknowledged, the transmitter advances the sliding window so that more data can be transmitted. Note that a sliding window is specified by a lower time slot index and an upper time slot index. The transmitter can keep transmitting until it reaches the upper time slot index without receiving acknowledgements for time slots within the window.

FIG. 2C summarizes the acknowledgments 285, as grouped into cumulative acknowledgments 287 and selective acknowledgments 289, for nodes 290(A-C). For example, node B is cumulatively acknowledged by time slot 10. Other nodes are mentioned up to slot 10, but there is no negatively acknowledged time slot for node B, at least up to and including slot 10. In this example, node B does not require a selective acknowledgment. Conversely, node C does not require a cumulative acknowledgment because time slot 7 is a negative acknowledgment. Consequently, node C only requires a selective acknowledgment for time slot 9.

FIGS. 2A and 2B also show processed-through counter 260. The processed-through-counter (PTC) is a counter associated with the receiver which represents the latest time slot that it has already processed. Although each node receives its own cumulative and selective acknowledgments in response to sent packets, all nodes receive the same PTC from the receiver.

The PTC enables each node to determine which packets to resend up to and including the time slot of the PTC. In the example in FIG. 2B, assume that the PTC indicates that the receiver has processed all the received time slots up to time slot 8. Node A can determine that it must resend the packets associated with time slot 4 because it has received a cumulative acknowledgment up to time slot 2 and a selective acknowledgment from time slots 4-8. In the selective acknowledgment node A can determine that its transmitted packets associated with time slot 4 have not been received. This is because the PTC is at or beyond time slot 4 (i.e., it is at time slot 8). Once node A determines that the packets associated with time slot 4 should be re-transmitted, the node can re-transmit those packets instead of waiting for a specific time (e.g., as kept by a re-transmit timer). In other words, node A can retransmit packets corresponding to time slot 4 without maintaining a re-transmit timer.

Note that a cumulative or selective acknowledgment can go beyond the PTC. This is because the receiver might only be able to send positive acknowledgments but not yet advance the PTC to a point at or beyond the positive acknowledgments. However, a sending node can only infer which packets to re-transmit for packets in time slots at or before the latest time slot designated by the PTC. That is, the sender can combine the knowledge of the received acknowledgement with the information carried in the PTC to identify which packets to re-transmit without using a re-transmit timer.

Note that the PTC does not advance beyond the time slot corresponding to the earliest unacknowledged packet. This configuration serves as: (a) an implicit receiver window control, (b) a low-overhead cumulative negative acknowledgment mechanism, and (c) a timerless operation. Furthermore, the PTC operates as an implicit receiver window control because if the receiver does not advance its PTC, senders will eventually fill their send windows and not send more data.

The PTC also operates as a low-overhead cumulative negative acknowledgment because it can be implemented in a small numerical field in a slot header that informs neighboring nodes that if they have not received an implicit or explicit acknowledgment of their data, they should assume their data is lost. The PTC facilitates timerless operation because a transmitting node does not need to keep a re-transmission timer.

Overall System Operation

Figure 3:
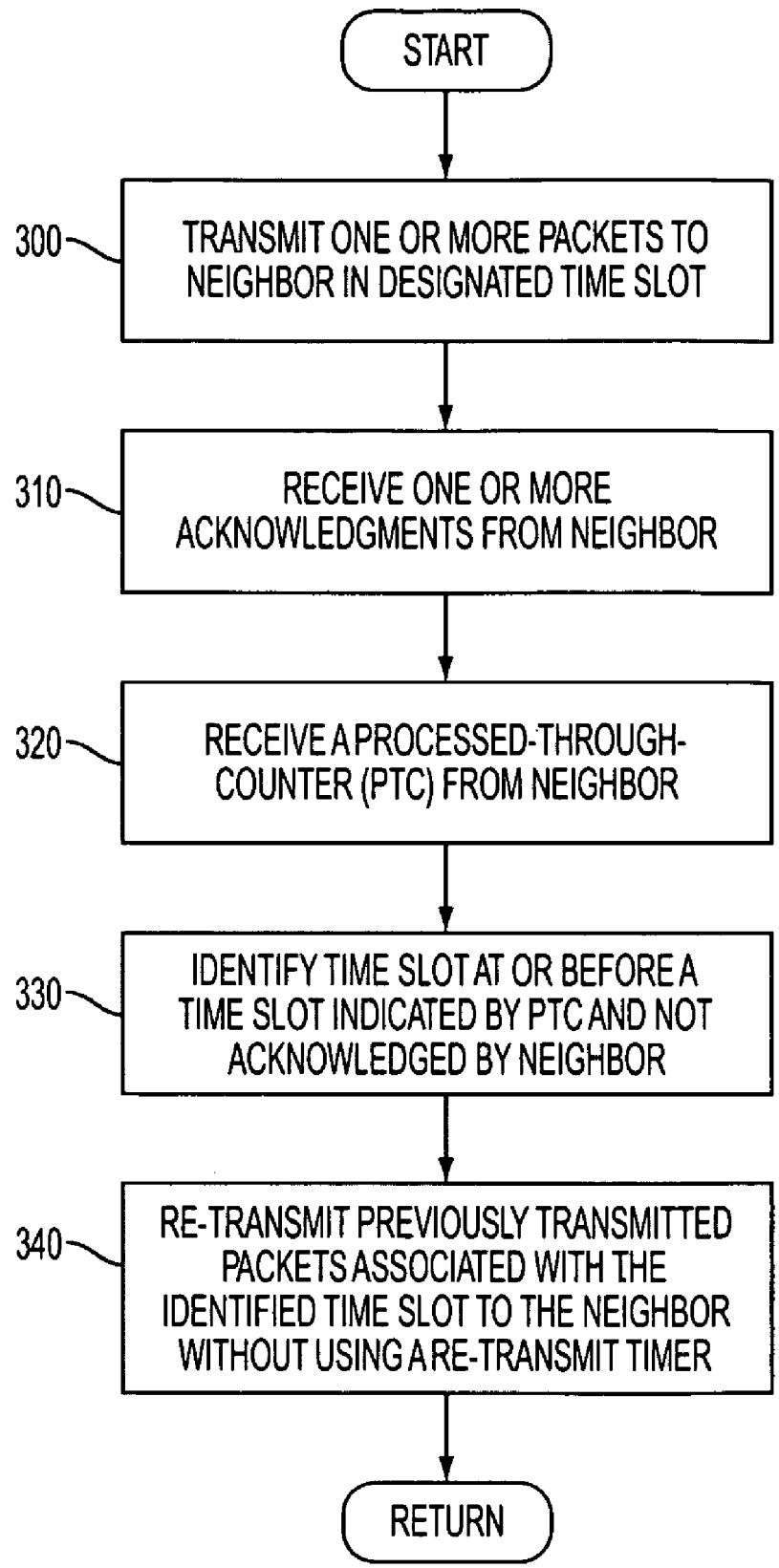
FIG. 3 presents a flowchart illustrating the process of re-transmitting packets in a communication network by a sender in accordance with an embodiment of the present invention.

FIG. 3 presents a flowchart illustrating the process of re-transmitting packets in a communication network by a sender. During operation, the system transmits one or more packets to a neighbor in a designated time slot (operation 300). Next, the system receives one or more acknowledgments from the neighbor (operation 310). A respective acknowledgment confirms that the data packets in a given past time slot have been processed by the neighbor. The system also receives a PTC from the neighbor (operation 320). The PTC indicates a time slot, and the packets transmitted up to the one indicated in the PTC have either been received and acknowledged by the neighbor, or have not been received successfully by the neighbor. In other words, the PTC does not advance beyond a time slot that has been received but not processed or acknowledged. However, the PTC does advance beyond a time slot that is not successfully received, because there is nothing to process for that time slot.

After receiving the acknowledgments and PTC, the system identifies a time slot which is at or before a time slot indicated by the PTC and not acknowledged by the neighbor (operation 330). Next, the system re-transmits previously transmitted packets associated with the identified time slot to the neighbor without using a re-transmit timer (operation 340).

Figure 4:
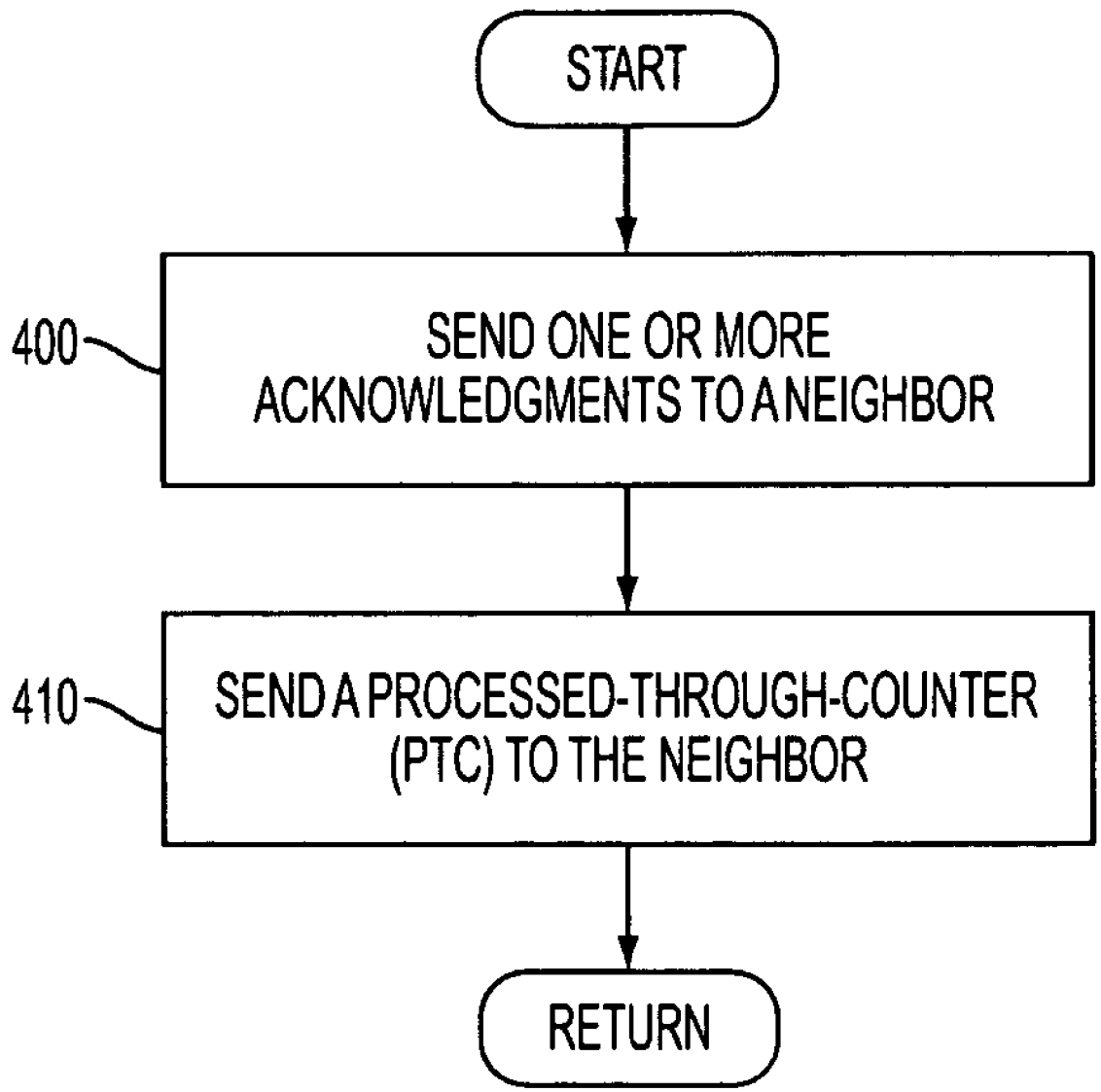
FIG. 4 presents a flowchart illustrating the process of a receiver facilitating packet re-transmission in accordance with an embodiment of the present invention.

FIG. 4 presents a flowchart illustrating the process of a receiver facilitating re-transmission. During operation, the receiver sends one or more acknowledgments to a neighbor (operation 400). Note that the system does not use a re-transmit timer associated with this operation. A respective acknowledgment confirms that the data packets in a given past time slot have been processed. Next, the system sends a PTC to the neighbor (operation 410). The PTC indicates a time slot, which implies that the packets transmitted in any time slot up to the one indicated in the PTC have either been received and acknowledged, or have not been received successfully.

Time Slot Acknowledgment Protocol

In one embodiment, the system can identify packets by the tuple {src, dst, pktid}, where src is the node identifier of the packet origin, dst is the identifier for the packet destination (including multicast and broadcast), and pktid is a unique per-flow sequence number, which can be an IP fragment and byte offset, a TCP byte offset or other forms of identifier. The destination, dst, is an optional part of the tuple.

A slot number can be absolute and unique. In embodiments of the present invention, the slot number can be expressed as a combination of a unique frame number and a cyclical slot number.

The sender can keep a send window data structure of all unacknowledged packets. Let these packets be called $T_i$, where i is an index to the data representing the acknowledgments, such as the unique end-to-end packet identifier. The system can limit the size of the send window. The sender maintains a second data structure of which data packets are sent in which slot, indexed by slot. Let $S_i = \{T_{j0}, \ldots, T_{jk}\}$ be the ordered list of packets sent in time slot i. This ordering is to maintain a FIFO order where possible.

The sender keeps a re-transmit queue called X. The re-transmit queue is an ordered list of elements in T that must be re-transmitted. The ordering allows FIFO packet forwarding.

The receiver maintains a data structure of received packets $R_i$, where i is an index such as the end-to-end identifier of the packet. The data structure in R contains the actual data packet indexed by i and meta-information, such as the received time, input interface, or other items. A receiver can keep another index Q of the R set ordered by the time at which the packet was received. Typically, Q would be a minimum heap of R, sorted by the received time. The data structure Q is an index of the R structure. R is a mapping from packet id to data packet for received packets. Thus the Q index is a mapping from the received time order to a packet entry. Here, time can be measured in slot numbers. The receiver also maintains a PTC. The PTC tracks how far in the received buffer a node has processed the received packets. Processing a received packet means either (a) re-transmitting the packet if implicit acknowledgements are used, or (b) sending an explicit acknowledgment for the packet.

In one embodiment of the present invention, each node keeps a list of packets to explicitly acknowledge, called the E set (or queue). The E queue is the explicit acknowledgement send queue and stores its elements in an unspecified order (though typically in FIFO order). An explicit acknowledgment may take many forms, one being the tuple {id, CO, BV}, where id is the node being acknowledged, CO is the cumulated slot offset, and BV is a bit vector of properly received slots from id beginning at time slot currentSlot−CO+1. Here, currentSlot corresponds to a current time, synchronized across all nodes in the network. Note that if CO=0, then BV is empty. This is a version of selective acknowledgment. Nodes can use a send window size such that the size of an explicit acknowledgment does not grow too large. The choice of a send window size can depend on the system parameters.

Initialization at a Node

A node can initialize itself by performing the following operations: set the send window T to empty, set the receive window R to empty, set the explicit acknowledgments E to empty, set the re-transmit queue to empty, and set the PTC to 0.

Receiving Packets from an Upper Layer

When a node receives a packet from an upper layer, such as IP, it can determine if the packet originated on the node or is a transit packet. If the packet is originated locally, the packet can be assigned a new end-to-end flow identifier and encapsulated for the system. This can be recorded in the R data structure and the Q index. If the packet is a transit packet, it can be back-referenced to the R data structure. For example, when a packet is received from the network, an IP extension header can carry the back-reference. If the packet is a transit packet but arrives on a different interface that does not support the current acknowledgement scheme, the packet can be added to the R data structure and Q index as if locally originated.

Data Transmission

For each packet in the time slot i, the sender can create $S_i$ as a list of the packets in the send window. In one embodiment of the present invention, the S set can be a reference to the T set and does not need to be a copy of the packet. For each packet in the slot, the system can remove the packet from Q.

If a node wishes to delay the transmission of a particular packet to a later time the sender can initiate the following operations. If the packet is associated with a received time slot that is less than or equal to the PTC and the node wishes to delay the transmission of the packet at a time slot beyond the PTC, then the packet can be explicitly acknowledged by adding it to the E list. The node can include any necessary explicit acknowledgments.

The sender also maintains other information. For notational purposes, let there be a PTC (denoted as QPTC) based off the Q data structure and a PTC (denoted as EPTC) based on the E data structure. If Q is empty, then the QPTC can be set to currentSlot. Otherwise, the QPTC can be set to [(the minimum time in Q)−1]. Because Q is stored as a minimum heap, finding the minimum element in Q involves looking at the first element $Q_0$. The minimum time in Q would then be read from the packet entry pointed to by $Q_0$. If the E queue is empty, then the EPTC can be set to currentSlot. Otherwise, the EPTC can be set to [(the minimum time of the corresponding R)−1]. Setting the EPTC involves several steps. Let $t_e$ be the received slot number for each element e in the E queue. First, compute the packet index i for each element e in the E queue. Next, set $t_e$ to the received time in the $R_i$ packet entry. Subsequently, set the EPTC to a minimum $t_e$. PTC can be set to the minimum of the QPTC and the EPTC. This method ensures that the PTC never advances beyond the minimum time held in the Q index and the minimum time held in the unsent explicit acknowledgment in queue E. In the packet header, a processed through offset (PTO) can be set to currentSlot−PTC. This offset is a compact encoding of the relative offset. As mentioned previously, using a relative offset for time slot numbers typically requires fewer bits than using a sequence number counter. Note that the EPTC and QPTC are processed-through-counters and thus they have a dimension of an absolute slot number. A PTO has a dimension of a relative slot number, relative to the slot in which the PTO is transmitted.

Data Receiving

In one embodiment of the present invention, a received slot is denoted as slot i. For each packet, the packet can be a received packet if the MAC-layer destination is the current node, a broadcast address, or a subscribed multicast address. For each packet (received and non-received), the receiver can look up the packet identifier in T. If there is a match, the receiver can remove the packet from the set T. This is one way to account for implicit acknowledgments.

For each received packet, the receiver can check to see if the packet is in the R set. If it is, it is a duplicate packet and should be explicitly acknowledged. The receiver adds the end-to-end identifier in the E set. The duplicate packet is then dropped. If there is no match in the R set, the receiver adds it to the R set and passes the packet to the network layer. If the system is using the Q index, the packet can also be added to the Q set. When passing the packet to the network layer, the node can record the end-to-end identifier in the IP extensions of the data if necessary. The node can now process any explicit acknowledgments in the slot. The node can also now process the PTO field in the slot header.

Sending Explicit Acknowledgments

The E queue can be a list of packet identifiers. The sending node can de-reference the packet identifiers to the R data structure to determine in which slot the packet was first received. The system can then construct the proper explicit acknowledgment of the packet. One preferred structure is the selective acknowledgment format described earlier.

Processing Explicit Acknowledgments

For each explicit acknowledgment, the node can process any time slot for which the explicitly acknowledged id matches the current node's identifier. In one embodiment of the present invention, currentSlot−CO is denoted by t. For each $S_j$ where $j \leq t$, the node can remove each $m \in S_j$ from T, as it is explicitly acknowledged. In one embodiment of the present invention, t+i+1 is denoted by t'. For each bit at index i (0 base) in BV, the system can remove each $m \in S_{t'}$ from T. The system can remove all $S_j$ so processed.

Processing the PTO

The receiver can compute the absolute slot number i as the current slot number minus the PTO. For each $S_j$ where $j \leq i$, in ascending order j, the sender can send each $m \in S_j$ that is also in T to the re-transmit queue X in order, then remove m from $S_j$, and eventually remove $S_j$ when the retransmit queue X becomes empty. The ordered list X must be unique, as a given $n \in T$ may exist in multiple S lists. Because the S lists are processed in ascending order, the FIFO ordering is maintained in re-transmissions.

Computer and Communication System

Figure 5:
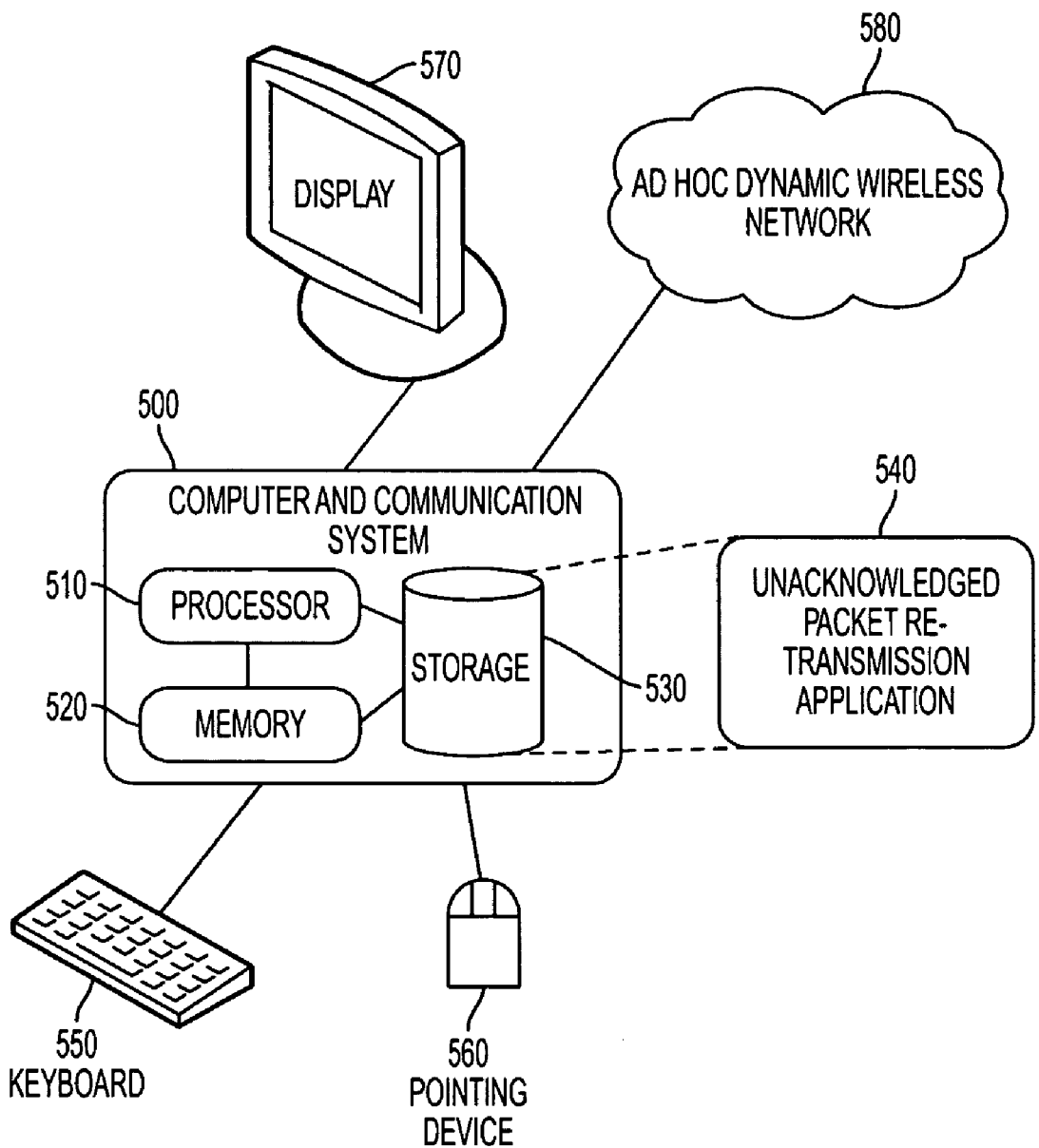
FIG. 5 presents an exemplary computer system for facilitating re-transmitting packets in a communication network in accordance with an embodiment of the present invention.

FIG. 5 presents an exemplary computer system for facilitating re-transmitting unacknowledged packets in accordance with an embodiment of the present invention. In FIG. 5, a computer and communication system 500 includes a processor 510, a memory 520, and a storage device 530, all of which are coupled together. Storage device 530 stores programs to be executed by processor 510. Specifically, storage device 530 stores a program 540 that implements a system (application) for facilitating re-transmitting unacknowledged packets.

Computer and communication system 500 is coupled to an optional display 570, keyboard 550, and pointing device 560. The display, keyboard, and pointing device can facilitate re-transmitting unacknowledged packets. Computer and communication 500 is also coupled to ad hoc dynamic wireless network 580, through which the node can send, receive, and forward packets, and can send and receive acknowledgments and PTC's. The network connection can be wireless, ad hoc, and dynamic. That is, the neighbors of a node are determined by a transmitting range and all nodes are mobile.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for facilitating re-transmitting unacknowledged packets and receiver window control in a communication network, comprising:
   transmitting one or more packets to one or more neighbors in a designated time slot;
   receiving one or more acknowledgments from a respective neighbor, wherein a respective acknowledgment is associated with a given past time slot and confirms that the data packets in the time slot have been processed by the neighbor;
   receiving a processed-through-counter (PTC) from the neighbor,
      wherein the PTC is a single value indicating a time slot;
      wherein the packets transmitted in any time slot up to the time slot indicated in the PTC have either been received and acknowledged by the neighbor or have not been received successfully by the neighbor; and
      wherein the PTC does not advance beyond a time slot corresponding to a earliest unacknowledged packet;
   identifying a time slot, up to the time slot indicated in the PTC and which has not been acknowledged by the neighbor; and
   re-transmitting previously transmitted packets associated with the identified time slot to the neighbor without using a re-transmit timer.

2. The method of claim 1, further comprising maintaining a send window of all unacknowledged packets.

3. The method of claim 1, further comprising maintaining an index of which packets are sent in which time slots.

4. The method of claim 1, further comprising maintaining a re-transmit queue of an ordered list of packets which can be re-transmitted.

5. The method of claim 1, wherein the respective acknowledgment comprises one or more of:
an implicit acknowledgment;
a cumulative acknowledgment; and
a selective acknowledgment.

6. A computer-executed method for re-transmitting packets and receiver window control in a communication network, comprising:
sending one or more acknowledgments to one or more neighbors,
wherein a respective acknowledgment is associated with a given past time slot and confirms that data packets in the time slot have been processed; and
sending a processed-through-counter (PTC) to the neighbor,
wherein the PTC is a single value indicating a time slot;
wherein the data packets transmitted in any time slot up to the time slot indicated in the PTC have either been received and acknowledged or have not been received successfully; and
wherein the PTC does not advance beyond a time slot corresponding to a earliest unacknowledged data packet.

7. The method of claim 6, further comprising maintaining an index of received packets.

8. The method of claim 6, further comprising maintaining an index of the time slot at which a packet was received.

9. The method of claim 6, wherein the respective acknowledgment comprises one or more of:
an implicit acknowledgment;
a cumulative acknowledgment; and
a selective acknowledgment.

10. An apparatus for facilitating re-transmitting packets and receiver window control in a communication network, comprising:
a transmitting mechanism configured to transmit one or more packets to one or more neighbors in a designated time slot;
an acknowledgment-receiving mechanism configured to receive one or more acknowledgments from a respective neighbor, wherein a respective acknowledgment is associated with a given past time slot and confirms that the data packets in the time slot have been processed by the neighbor;
a processed-through-counter (PTC) receiving mechanism configured to receive a PTC from the neighbor,
wherein the PTC is a single value indicating a time slot;
wherein the packets transmitted in any time slot up to the time slot indicated in the PTC have either been received and acknowledged by the neighbor or have not been received successfully by the neighbor; and
wherein the PTC does not advance beyond a time slot corresponding to a earliest unacknowledged packet;
an identification mechanism configured to identify a time slot, up to the time slot indicated in the PTC and which has not been acknowledged by the neighbor; and
a re-transmitting mechanism configured to re-transmit previously transmitted packets associated with the identified time slot to the neighbor without using a re-transmit timer.

11. The apparatus of claim 10, wherein while re-transmitting unacknowledged packets, the re-transmission mechanism is configured to maintain a send window of all unacknowledged packets.

12. The apparatus of claim 10, wherein while re-transmitting unacknowledged packets, the re-transmission mechanism is configured to maintain an index of which packets are sent in which time slots.

13. The apparatus of claim 10, wherein while re-transmitting unacknowledged packets, the re-transmission mechanism is configured to maintain a re-transmit queue of an ordered list of packets which can be re-transmitted.

14. The apparatus of claim 10, wherein the respective acknowledgment comprises one or more of:
an implicit acknowledgment;
a cumulative acknowledgment; and
a selective acknowledgment.

15. An apparatus for facilitating re-transmitting packets and receiver window control in a communication network, comprising:
an acknowledgment-sending mechanism configured to send one or more acknowledgments to a neighbor,
wherein a respective acknowledgment is associated with a given past time slot and confirms that data packets in the time slot have been processed; and
a processed-through-counter-sending mechanism configured to send a processed-through-counter (PTC) to the neighbor,
wherein the PTC indicates a time slot;
wherein the data packets transmitted in any time slot up to the time slot indicated in the PTC have either been received and acknowledged or have not been received successfully; and
wherein the PTC does not advance beyond a time slot corresponding to a earliest unacknowledged data packet.

16. The apparatus of claim 15, wherein the respective acknowledgment comprises one or more of:
an implicit acknowledgment;
a cumulative acknowledgment; and
a selective acknowledgment.

* * * * *